United States Patent
Li et al.

(10) Patent No.: US 8,785,111 B2
(45) Date of Patent: Jul. 22, 2014

(54) HYDROPHILIC NANOPOROUS MATERIALS

(75) Inventors: Li Li, Lyngby (DK); Sokol Ndoni, Rødovre (DK); Rolf Henrik Berg, Rungsted Kyst (DK); Lars Schulte, Ishøj (DK); Martin E. Vigild, Farum (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 13/133,701

(22) PCT Filed: Dec. 9, 2009

(86) PCT No.: PCT/EP2009/066716
§ 371 (c)(1),
(2), (4) Date: Aug. 26, 2011

(87) PCT Pub. No.: WO2010/066782
PCT Pub. Date: Jun. 17, 2010

(65) Prior Publication Data
US 2011/0305993 A1  Dec. 15, 2011

Related U.S. Application Data

(60) Provisional application No. 61/193,584, filed on Dec. 9, 2008.

(30) Foreign Application Priority Data

Dec. 9, 2008 (EP) .................................... 08171109

(51) Int. Cl.
*G03F 7/26* (2006.01)

(52) U.S. Cl.
USPC .......................................... 430/322; 430/328

(58) Field of Classification Search
USPC .................................................. 430/328, 322
See application file for complete search history.

(56) References Cited

U.S. PATENT DOCUMENTS

| 4,981,770 | A | * | 1/1991 | Taylor ........................... 430/313 |
| 2002/0055239 | A1 | * | 5/2002 | Tuominen et al. ............ 438/466 |
| 2006/0211816 | A1 | | 9/2006 | Ho et al. |
| 2007/0066080 | A1 | | 3/2007 | Kugler et al. |
| 2009/0269016 | A1 | * | 10/2009 | Korampally et al. ......... 385/129 |

OTHER PUBLICATIONS

Chen, C. et al. "Facile loading of metal ions in the nanopores of polymer thin films and in situ generation of metal sulfide nanoparticle arrays," Nanotechnology (Jul. 25, 2008); 19: 1-5.

(Continued)

*Primary Examiner* — Caleen Sullivan
(74) *Attorney, Agent, or Firm* — McHale & Slavin, P.A.

(57) ABSTRACT

The present application discloses a method for preparing and rendering hydrophilic a nanoporous material of a polymer matrix which has a porosity of 0.1-90% (v/v), such that the ratio between the final water absorption (% (w/w)) and the porosity (% (v/v)) is at least 0.05, the method comprising the steps of: (a) preparing a precursor material comprising at least one polymeric component and having a first phase and a second phase; (b) removal of at least a part of the first phase of the precursor material prepared in step (a) so as to leave behind a nanoporous material of the polymer matrix; (c) irradiating at least a part of said nanoporous material with light of a wave length of in the range of 250-400 nm (or 200-700 nm) in the presence of oxygen and/or ozone. Corresponding hydrophilic nanoporous materials are also disclosed.

1 Claim, 7 Drawing Sheets

(56) References Cited

OTHER PUBLICATIONS

Guo, F. et al. "Influence of 1,2-PB matrix cross-linking on structure and properties of selectively etched 1,2-PB-b-PDMS block copolymers," Macromolecules 2007 (Apr. 18, 2008), 40: 3669-3675.
Guo, F. et al. "One-Step Routes from Di- and Triblock Copolymer Precursors to Hydrophilic Nanoporous Poly(acrylic acid)-b-polystyrene," Macromolecules 2008 (Jan. 23, 2008); 41: 1486-1493.
Hansen, M.S. et al. "Nanoporous Crosslinked Polyisoprene from Polyisoprene-Polydimethylsiloxane Block Copolymer," Polymer Bulletin (2004); 51: 403-409.
Hozumi, A. et al. "Photochemical fabrication of a well-defined diblock copolymer nanotemplate using 172-nm vacuum ultraviolet light," Journal of Colloid and Interface Science (2005); 285: 875-878.
Ndoni, S. et al. "Nanoporous materials with spherical and gyroid cavities created by quantitative etching of polydimethylsiloxane in polystyrene-polydimethylsiloxane block copolymers," J. Am. Chem. Soc. (2003); 125: 13366-13367.
Piton, M. et al. "Photooxidation of polybutadiene at long wavelengths ($\lambda > 300$ nm)," Polymer Degradation and Stability (1996); 53: 343-359.
Rzayev, J. et al. "Nanoporous Polystyrene Containing Hydrophilic Pores from an ABC Triblock Copolymer Precursor," Macromolecules (2004); 38: 3-5.
Rzayev, J. et al. "Nanochannel Array Plastics with Tailored Surface Chemistry," J. Am. Chem. Soc. (2005); 127: 13373-13379.
Zalusky, A.S. et al. "Ordered Nanoporous Polymers from Polystyrene-Polylactide Block Copolymers," J. Am. Chem. Soc. (2002); 124: 12761-12773.
International Search Report and Written Opinion of the International Searching Authority (EP) for International Application No. PCT/EP2009/066716, search and opinion completed Feb. 10, 2010.

* cited by examiner (A)

(B)

US 8,785,111 B2

HYDROPHILIC NANOPOROUS MATERIALS

CROSS-REFERENCE TO RELATED APPLICATIONS

This application is a §371 national stage entry of International Application No. PCT/EP2009/066716, filed Dec. 9, 2009, which claims priority to European Application No. EP 08171109.5, filed Dec. 9, 2008, and U.S. Provisional Application No. 61/193,584, filed Dec. 9, 2008, the entire contents of which are incorporated herein by reference.

FIELD OF THE INVENTION

The invention relates to originally hydrophobic nanoporous materials which at least in part have been rendered (more) hydrophilic by application of irradiation in the presence of a photo-active oxidant. Such materials have a broad range of applications, e.g. in membranes, in sensors, etc.

BACKGROUND OF THE INVENTION

Ndoni et al. (J. Am. Chem. Soc. 2003, 125, 13366-13367) disclose nanoporous materials prepared from polystyrene-polydimethylsiloxane block copolymers with subsequent etching with HF which causes removal of the polydimethylsiloxane component.

US 2006/211816 discloses nano-scale helical microstructures and micro-channels prepared from self-assembling poly(styrene)-poly(L-lactide) block copolymers of which the poly(L-lactide) component is subsequently removed by hydrolysis. The reference further discloses porous polymeric materials having regions that exhibit distinct surface properties, cf. the abstract.

Piton and Rivaton (Polymer Degradation and Stability 53 (1996) 343-359) disclose the mechanisms of photooxidation of polybutadienes upon exposure to UV radiation ($\lambda$>300 nm) in the presence of oxygen. The various degradation products are analysed in order to obtain a better understanding of the reaction mechanisms.

US 2007/0066080 (Seiko Epson Corporation) discloses a substrate having a surface comprising adjacent areas which have different hydrophilicities and/or oleophilicities.

Most of the reported nanoporous materials, however, are hydrophobic with polymer-air interfaces not easily prone to further chemical modification as needed for advanced surface functionality.

BRIEF DESCRIPTION OF THE INVENTION

The method of the invention provides an attractive route towards modification of the hydrophobic/hydrophilic properties of the materials without any significant degradation of the material.

In view of the documents referred to above, it has surprisingly been found that modification of the nanoporous materials by application of irradiation and a photo-active oxidant is in fact feasible, because photo-degradation of the thin-walled polymer material—which would have been expected under the oxidative conditions, and which would be detrimental to the subsequent use of the material—is substantially avoided.

In particular, the present invention provides a method according to claim 1.

Further, the present invention provides novel nanoporous materials, cf. claims 9 and 10.

Still further, the present invention provides various uses of such materials, cf. claim 13.

DETAILED DESCRIPTION OF THE INVENTION

Figure 1:
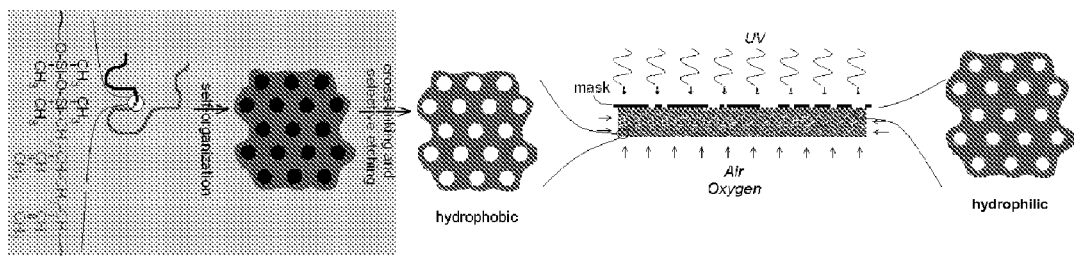
FIG. 1. Conceptual scheme for the present invention. The grey-shaded part of the scheme represents the preparation modality, contingent to the preparation steps of a specific nanoporous material. The unshaded part is in line of principle generic, as argued in the present document. From left-to-right: chemical composition of a single diblock copolymer molecule. The morphologies of the self-organized copolymer realized in the present work are hexagonally packed cylinders (HEX) and double gyroid (GYR) of PDMS (black) in a matrix of 1,2-PB (red); HEX is shown in the scheme due to ease of 2-d illustration. The 1,2-PB micro-phase is first cross-linked for 2 h at 140° C. by free radical reaction in the absence of oxygen; the PDMS is then specifically and quantitatively removed by treatment with tetrabutyl ammonium fluoride. The obtained nanoporous polymer is photo-oxidized by UV radiation; a mask can be used for patterning. The irradiated zones become eventually hydrophilic due to UV-mediated fixation of oxygen onto the pore walls in the form of carboxylic acids and hydroxyls.

A first aspect of the invention relates to a method for the preparation of a nanoporous material of a polymer matrix which has a porosity of 0.1-90% (v/v) and an initial water absorption (% (w/w)) such that the ratio between said initial water absorption (% (w/w)) and said porosity (% (v/v)) is at the most 0.05, said matrix at least in part being rendered more hydrophilic so that said part of said polymer matrix has a final water absorption (% (w/w)) such that the ratio between said final water absorption (% (w/w)) and said porosity (% (v/v)) is at least 0.05, the method comprising the steps of:
(a) preparing a precursor material comprising at least one polymeric component and having a first phase (or micro-phase) and a second phase (or micro-phase);
(b) removal of at least a part of the first phase (or micro-phase) of the precursor material prepared in step (a) so as to leave behind a nanoporous material of the polymer matrix;
(c) irradiating at least a part of the surface of said nanoporous material with photons of a wave length of in the range of 250-400 nm (or 200-700 nm) in the presence of oxygen and/or ozone.

The rationale behind the present invention is to render a nanoporous material of a polymer matrix, which initially is at least somewhat hydrophobic (i.e. characterized in that the ratio between said initial water absorption (% (w/w)) and said porosity (% (v/v)) is at the most 0.05), more hydrophilic (i.e. so that the ratio between said final water absorption (% (w/w)) and said porosity (% (v/v)) is at least 0.05) by means of exposure of the material to radiation in the presence of oxygen and/or ozone, but with the simultaneous preservation of the intimate nanostructure and the mechanical stability of the material.

In the present context, the term "nanoporous" refers to a material having an average pore diameter in the nanometer range, i.e. below 1 µm. Hence, the materials contain cavities of various size distribution (typically specified in accordance with the preparation of the nanoporous material), such as voids in the material which fall in the range of 1 nm to 1 mm, such as regular spherical, cylindrical or layered cavities of typical internal diameters of 1-1000 nm, preferably below 500 nm, in particular below 250 nm.

Preferably, the average pore diameter is in the range of 1.0-100 nm (nanometers), such as in the range of 10-50 nm, or in the range of 5-20 nm. It is also preferred that the periodicity of the pores is in the range of 1.0-100 nm. In particular, the pores of said nanoporous material have an average diameter in the range of 1.0-100 nm and a periodicity in the range of 1.0-100 nm.

Depending on the modality of preparation the porosity can vary between 0.1 and 90% (v/v). The typical porosity in the case of nanoporous polymers prepared from block copolymer precursors is between 10 and 60% by volume.

The average pore diameter and the porosity are determined by isothermal gas adsorption, the so-called BET method using nitrogen as probing gas and by electron microscopy (TEM or SEM). For certain morphologies, like the hexagonally packed cylindrical pore morphology, the average pore diameter can be estimated from small angle x-ray scattering measurements(SAXS).

Figure 3:
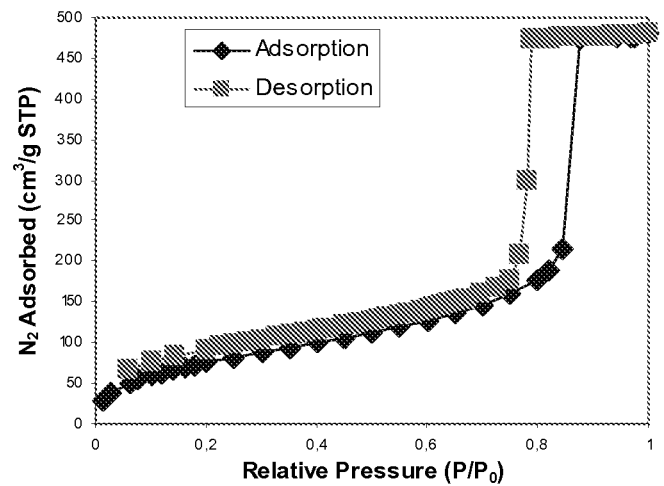
FIG. 3. (A) Nitrogen adsorption isotherm and (B) the pore size distribution for a nanoporous cross-linked polybutadiene of gyroid morphology as calculated by the BET method.
Figure 3:
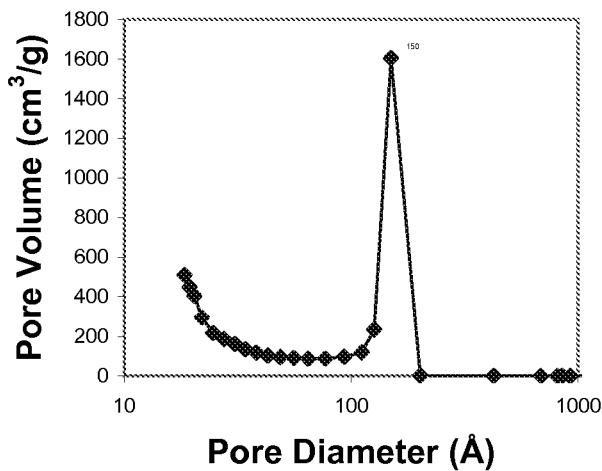

By the term "average" in connection with the term "pore diameter" is meant the value of the pore diameter for a (hypothetical) model material with perfectly uniform pores and having the same porosity as the real material. For example, the average and the standard deviation of pore diameter determined by BET of one nanoporous material was 15±5 nm (see Example related to FIG. 3).

The periodicity of the pores is determined by small angle scattering methods, typically small angle x-ray scattering (SAXS).

The "initial" water absorption of the nanoporous material refers to the capability of water absorption of the material obtained after steps (a) and (b) in the method, i.e. before irradiation in step (c). On the other hand, the "final" water absorption of the nanoporous material refers to the water absorption of the nanoporous material after step (c), i.e. after the relevant part of the material has been rendered (more) hydrophilic.

Water absorption is determined by means of the "Water absorption test": Water absorption was measured as a difference between the mass of the nanoporous sample after contact with water and the dry mass. The contact with water was realized by submerging a piece of thoroughly dry nanoporous material directly into excess of distilled water (of Milli-Q purity or better) for at least 24 h. Typical sample masses used in the experiments were in the range 20-200 mg. The masses were measured by analytical balances with accuracy ±0.1 mg.

The key issue is to improve the hydrophilicity of the material, i.e. so that the ratio between said final water absorption (% (w/w)) and said porosity (% (v/v)) is at least 0.05. It should be understood that the degree of water absorption in terms of % (w/w) is dependent on the porosity (% (v/v)) of the material. Therefore, the degree of hydrophilicity is expressed as the ration between the water absorption and the porosity. In particularly interesting embodiments, the ratio between said final water absorption (% (w/w)) and said porosity (% (v/v)) is at least 0.10, such as at least 0.25, or even at least 0.5, or at least 0.75.

With respect to the initial water absorption, the ratio between said initial water absorption (% (w/w)) and said porosity (% (v/v)) is at least 0.05, and typically even lower, such as below the detection limit, or less than 0.01, e.g. less than 0.005.

The "water contact angle" is an important first measure for the hydrophilicity/hydrophobicity of the materials of the polymer matrix used herein. The "water contact angle" is determined by a contact angle instrument equipped with a high resolution camera.

The "initial" water contact angle of the nanoporous material refers to the static water contact angle of the material obtained after steps (a) and (b) in the method, i.e. before irradiation in step (c). On the other hand, the "final" water contact angle of the surface of the nanoporous material refers to the static water contact angle of the nanoporous material after step (c), i.e. after the relevant part of the surface of the material has been rendered (more) hydrophilic.

The "surface" of the nanoporous materials refers to the polymer-air interface and is experimentally determined by the BET nitrogen adsorption method. The specific surface area of the nanoporous polymers used here is typically in the range 100-300 $m^2/g$. Virtually all of the surface area is represented by the pore surface.

A "micro-phase" designates the chemical composition heterogeneity typical for composed molecules such as block copolymers. Micro-phase segregation, or self-assembling is typical for composition changes originating from intramolecular heterogeneity, while the "usualphase segregation" originates from intermolecular heterogeneity. For example, a diblock copolymer consists of one type of molecules, each composed of two chemically distinct parts (blocks) linked by a covalent bond. Depending on the relative block composition, the total degree of polymerization, temperature and pressure, the interplay between block immiscibility and connectivity can generate a variety of micro-phase segregated morphologies in the mesoscopic scale. See the example related to FIG. 1 as an illustration of micro-phase segregation.

By water uptake of the UV treated nanoporous polymer being "measurably" higher than that of the original nanoporous polymer is understood that a UV treated sample of at least 20.0 mg shows water absorption of at least 0.2 mg, typically of at least 2 mg as measured by an analytical balance of accuracy 0.1 mg. The water uptake (or absorption) of an untreated nanoporous sample of dry mass 20.0 mg is at most 0.2 mg, typically below the measurement limit of 0.1 mg.

Step (a)

In the first step of the method, a precursor material comprising at least one polymeric component and having a first phase and a second phase is prepared.

The material in question can be viewed as a precursor for the nanoporous material. The material comprises at least one polymeric component, i.e. the material may comprise at least one polymeric component in combination with non-polymeric constituents, such as low-molecular weight organic compounds, inorganic compounds (e.g. salts), etc.

A characterizing feature of the precursor material is the fact that it has a first phase and a second phase. The extent of the first phase substantially corresponds to the extent of the pores of the nanoporous material, whereas the extent of the second phase substantially corresponds to the extent of the polymer matrix of the nanoporous material. Hence, the preparation of the precursor material will to a large extent determine the average pore diameter and the periodicity of the pores in the nanoporous material.

Suitable precursor materials are, e.g., self-assembling block copolymers, polymer mixtures with other polymers or with low molecular mass organic or inorganic compounds and interpenetrating polymer networks.

Nanoporous materials have a number of appealing characteristics such as large surface area (from tens to hundreds $m^2g^{-1}$), confining pore-size within the range of molecular to macromolecular sizes (from few nm to tens of nm), high pore volume fraction (up to 60%), and correspondingly low values for mass density, refractive index and dielectric constant.

Block copolymers are prepared by sequential polymerization of at least two chemically different monomers or by coupling by e.g., condensation, grafting or other chemical reaction of at least two polymers of different chemical compositions. In the case of mixtures, the polymer and the other component(s) are intimately mixed by for example mechanical mixing and the structure is quenched by for example rapid cooling that transforms the polymeric component (matrix component) into a glassy or crystalline state. In the case of either block copolymers or mixtures cross-linking the matrix component can also be relevant. The removable components or porogenes are subsequently removed by washing or chemical reactions that leave unaltered the matrix component. To illustrate the preparation of interpenetrating polymer networks a first network can be firstly formed by for example cross-linking one polymeric component; at a second step a monomer of a second kind can be added that partially swells the first network and the polymerization/cross-linking of the second monomer is realized. At the final step one of the networks is specifically removed leaving behind the nanoporous second network.

Figure 2:
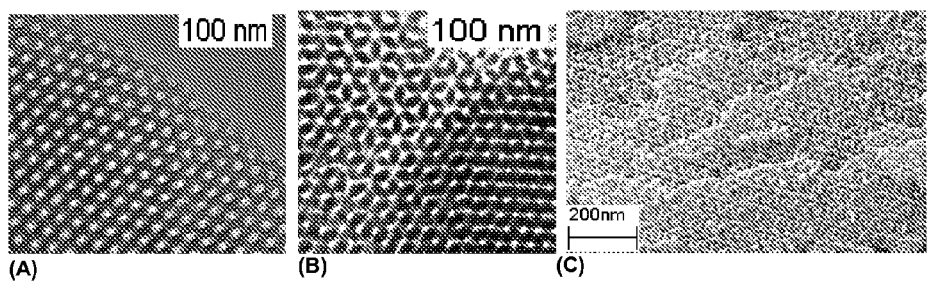
FIG. 2. (A, B) transmission and (C) scanning electron micrographs of two nanoporous cross-linked 1,2-PB samples. The darker regions in (A) and (B) represent the polymer matrix and the light regions the cavities; the opposite is valid in (C). (A) Hexagonally packed cylindrical pores of diameter 12 nm and principal spacing of 20 nm; (B, C) gyroid morphology of cubic symmetry with lattice constant of 45 nm and average pore diameter of 14 nm. The pore volume fraction in (A) is 0.30 and in (B) 0.44.

In one important embodiment, the material in step (a) is a micro-phase-segregated di-block copolymer consisting of two immiscible blocks connected by a covalent bond. Depending on the relative length of the two blocks (the composition) the material self-organizes into different morphologies, such as hexagonally packed cylindrical regions rich in one of the blocks surrounded by the matrix rich in the other block. For a given composition the total length of the block copolymer molecules determines the typical length-scale (e.g. cylinder diameter and distance between cylinders) of the micro-phase separation. Two different morphologies and the relative length-scales are illustrated in FIG. 2.

Self-assembling block copolymers are preferred precursors for nanoporous materials (NP) in the present invention. Before the preparation of the nanoporous material, which is realized by specific removal of one of the blocks (see below), the mechanical stability of the remaining block (the matrix) has to be ensured. This is either present at the relevant conditions (temperature, pressure, etc) due to the glassy or crystalline structure of the matrix component, or it is induced by chemical cross-linking of the matrix component prior to the preparation of the nanoporous material. In a preferred embodiment, the at least one polymeric component in step (a) is a block-copolymer.

In some interesting variants hereof, the block-copolymers are cross-linked. Cross-linking can be achieved in a number of ways, e.g., by use of dicumyl peroxide (bis($\alpha,\alpha$-dimethylbenzyl) peroxide) (DCP) as a cross-linking agent, cf. Hansen et al. Polymer Bulletin 2004, 51, 403-409; Guo et al. *Macromolecules* 2007, 40, 3669.

Suitable block-copolymers are, e.g., those containing one hydrocarbon polymer block such as polystyrene (PS) or a polydiene, such as polybutadiene (PB) or polyisoprene (PI).

An illustrative example of a block-copolymer is the type containing polydimethylsiloxane (PDMS), namely types of polydiene-polydimethylsiloxane.

In one particular embodiment, the phase-segregated material is a polystyrene-polysiloxane block copolymer of the type described by Ndoni et al. (J. Am. Chem. Soc. 2003, 125, 13366-13367).

In one particular embodiment, the phase-segregated material is a 1,2-polybutadiene-polysiloxane block copolymer of the type described further below.

The block-copolymer molecules can self-organise by micro-phase segregation into nanometer-scale structures. The type of structure and the typical length scales depend on—and are controlled by the relative block volumes of the block-copolymer molecules and by their molecular weight. The structure of the block-copolymer serves as a template to the final porosity of the nanoporous material after the polydiene fraction of the precursor melt is (optionally) cross-linked and the other block is removed by specific well-known reactions (see step (b)).

As such, such nanoporous materials based on block-copolymers are largely hydrophobic. This means that these materials cannot absorb any amounts of water although the porosity maybe around 30-60 vol %. The hydrophobicity greatly limits the use of nanoporous materials in many technical applications.

Step (b)

In a second step of the method, at least a part of the first phase of the precursor material prepared in step (a) is removed so as to leave behind a nanoporous material of the polymer matrix.

In some interesting embodiments, the removal of at least a part of the first phase of the material in step (b) is effected by means of chemical etching, photo-chemical etching, extraction, or evaporation, or a combination of these. For example in the case of the PS-PDMS block copolymer the PDMS block is chemically etched by first treating the block copolymer sample with anhydrous hydrogen fluoride (HF) and then removing the reaction products by evaporation under vacuum, as described by Ndoni et al. (*J. Am. Chem. Soc.* 2003, 125, 13366-13367). In another example, the PDMS component is removed from a polydiene-PDMS block copolymer by a first treatment with a solution of tetra (butyl ammonium fluoride) in tetrahydrofurane (THF) and a subsequent rinsing of reaction products with THF and methanol, as described by Hansen et al. (*Polymer Bulletin* 2004, 51, 403) and by Guo et al. (*Macromolecules* 2007, 40, 3669).

Preferably, the average pore diameter is in the range of 1.0-100 nm, such as in the range of 10-50 nm, or in the range of 5-20 nm. It is also preferred that the periodicity of the pores is in the range of 1.0-100 nm, such as in the range of 10-50 nm. In particular, the pores of said nanoporous material have an average diameter in the range of 1.0-100 nm and a periodicity in the range of 1.0-100 nm, such as an average diameter in the range of 10-15 nm and a periodicity in the range of 20-50 nm.

After step (b), the dry resulting nanoporous material put in direct contact with water does not take up measureable amounts of water spontaneously.

Step (c)

In a third step of the method at least a part of the surface of said nanoporous material is irradiated with UV light of a wavelength in the range of 250-400 nm in the presence of oxygen and/or ozone.

This invention makes it possible to change the chemical nature of the nanoporous materials in such a way that water may penetrate into the pores of the nanoporous structures. The effect of using this invention to nanoporous materials is a shift to more hydrophilic properties.

The irradiation takes place in the presence of oxygen, in the presence of ozone, or in the presence of a mixture of oxygen and ozone. The oxygen/ozone may be present in a mixture of other inert gasses, e.g., nitrogen, argon, etc. The partial pressure of oxygen/ozone should at least be 0.1 Pa, such as in the range of 100-100,000 Pa, such as 20,000-100,000 Pa.

For samples thicker than 100 µm the UV irradiation intensity through the sample falls significantly due to absorption. Therefore the degree of modification is higher close to the surface directly exposed to UV. It is possible to render hydrophilic the nanoporous material close to this surface to a depth of e.g. 100 µm while the nanoporous material beneath remains hydrophobic. Or in case of set-ups allowing sample UV irradiation from both sides, it is possible to leave hydrophobic a layer of sample around half thickness, while the rest is rendered hydrophilic.

Irradiation typically takes place for up to 1000 h, such as 1-50 h. The radiation intensity is typically between 1 and 1000 mW/cm$^2$, but it may be higher, e.g. when a laser is applied.

The temperature at which the irradiation takes place is not particularly critical, but for practical reasons, irradiation typically takes place at a temperature in the range of 0-80° C., however taking into account any phase transformation temperature the nanoporous material may have and the desire for suppression of thermo-oxidative effects. Most typically, irradiation takes place at temperature in the range of 10-50° C.

In some embodiments, the irradiation of the nanoporous material takes place in the simultaneous presence of an in-situ photoinitiator. Examples of such in-situ photoinitiators are benzophenone or acetophenone. If present, the in-situ photoinitiator (or mixture of photoinitiators) is typically present in an amount of 0-10% mass fraction.

The resulting material following irradiation absorbs water spontaneously when in contact with water.

Preferably, the water absorption of the resulting material is at least 1% (w/w), such as at least 2% (w/w), e.g. at least 5% (w/w), more preferably at least 10% (w/w). In some embodiments, the water absorption is at least 30% (w/w), such as equals the full porous volume available, e.g. 35% (w/w) in the example of nanoporous cross-linked polybutadiene of gyroid morphology illustrated in FIG. 4 (B).

By water uptake of the UV treated nanoporous polymer "measurably" higher than the original nanoporous polymer is understood that a UV treated sample of at least 20.0 mg shows water absorption of at least 0.2 mg, typically of at least 2 mg as measured by an analytical balance of accuracy 0.1 mg. The water uptake (or absorption) of an untreated nanoporous sample of dry mass 20.0 mg is at most 0.2 mg, typically below the measurement limit of 0.1 mg.

Preferably, the initial water contact angle is at least 90°, in particular in the range of 90-160°, such as in the range of 95-130°, e.g. in the range of 95-125°.

Figure 7:
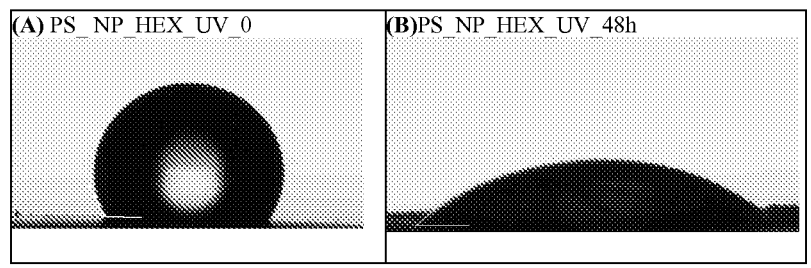
FIG. 7. Contact angle measurement of nanoporous PS (of hexagonal structure). (A) before UV treatment the angle is 117° (which is larger than the literature value for PS. This enhancement of contact angle is probably related to the presence of nanopores); (B) after UV treatment the angle is 34°. Part of the water droplet in (B) was absorbed into the nanoporous material within few minutes forming an opaque patch.

Preferably, the final water contact angle is less than 90°, in particular in the range of 0-70°, such as in the range of 20-60°, e.g. in the range of 30-60°. The example on nanoporous polystyrene shown in FIG. 7 illustrates the change of water contact angle induced by the UV-mediated oxidation of the material.

In some very interesting embodiments, the exposure of the nanoporous materials to UV light is done by the use of an appropriate mask which creates patterns of hydrophlic surface section, e.g. micrometer-scale patterns of hydrophilic surface sections, in the matrix of otherwise hydrophobic material. This gives the possibility of the manufacture of polymer chips which only absorp water into the the irradiated parts of the material. Hence, this invention offers the combination of bottom-up nanotechnology (molecular self-organisation) with top-down nanotechnology (lithographic patterning). Typical length-scales for patterning extend from few tens of nanometers to tens of millimeters, for example from 50 nanometers to 50 millimeters.

It is also envisaged that the exposure of the nanoporous material to UV light can be conducted in two or more steps, e.g. utilising different masks so as to create patterns having different degrees of hydrophilicity.

Further Modifications

It is envisaged that the resulting (more) hydrophilic nanoporous material obtained in step (c) containing hydrophilic chemical groups such as carboxyl and hydroxyl groups, can undergo further modifications (e.g. functionalisation) so as to introduce more specific properties to the nanoporous materials.

Hence, in one embodiment the method further comprises the step of:

(d) coupling of functional substances or molecules, such as chelating molecules (e.g. ion chelators useful as an ion indicator), biomolecules, hormones, amino acids, peptides, polypeptides, proteins, lipids, lipoproteins, carbohydrates (e.g. polysaccharides, such as dextran, heparin, glycogen, starch and cellulose), carbohydrate-conjugated proteins, membrane constituents, cellular components, receptors, luminescent (e.g. fluorescent) molecules, antigens, antibodies, reduction-oxidation (redox) active molecules, drugs, vitamins, haptens, toxins, nucleosides, nucleotides, nucleic acids (e.g. DNA or RNA), nucleic acid analogues, catalytic molecules (e.g. enzymes), or fragments or clusters thereof, reporter molecules, a member of a specific binding pair useful as a probe for the complementary member of that specific binding pair, by for example ester or amide bonds. The functional substance or molecule to be coupled may be an associated or conjugated substance or molecule, and it may be protected on one or more functional groups.

Novel Nanoporous Materials

It is envisaged that the nanoporous materials obtained in accordance with the method described above are novel as such.

Hence, the present invention also provides a nanoporous material obtainable by the process described hereinabove.

Further, the invention provides a nanoporous material, wherein the pores have an average diameter in the range of 1.0-100 nm, wherein the periodicity of the pores is in the range of 1.0-100 nm, and wherein the material has a porosity of 0.1-90% (v/v), said material having hydrophobic domains having a (first) water absorption (% (w/w)) such that the ratio between said (first) water absorption (% (w/w)) and said porosity (% (v/v)) is at the most 0.05, and one or more sets of relatively hydrophilic domains having a (second) water absorption (% (w/w)) such that the ratio between said (second) water absorption (% (w/w)) and said porosity (% (v/v)) is at least 0.05.

In one variant hereof the material consists of a polymer of ethylenically unsaturated monomers, e.g. monomers selected from the group which results in polymers consisting of 1,2-polybutadiene and polyisoprene.

In one example a polystyrene (PS) nanoporous polymer was obtained by selective etching of polydimethylsiloxane (PDMS) from a PS-PDMS block copolymer containing 29% of PDMS by volume. The etching procedure was as reported in Ndoni et al. (J. Am. Chem. Soc. 2003, 125, 13366-13367). A 20 μm thick film of nanoporous PS did not absorb any measurable quantity of Milli-Q water after 24 h in contact with excess of Milli-Q water. After 48 h of irradiation of wavelength in the range 275-380 nm, with maximum intensity at 310 nm and power of 7 mW/cm$^2$ at the sample position, the sample absorbed a quantity of Milli-Q water corresponding to the full pore volume created after the removal of PDMS.

In a second example, a cross-linked 1,2-polybutadiene (xPB) nanoporous polymer was obtained from a PB-PDMS block copolymer as described in Guo et al. *Macromolecules* 2007, 40, 3669. The volume fraction of PDMS in the precursor block copolymer was about 40%. A 500 μm thick film of nanoporous xPB did not absorb any measurable quantity of Milli-Q water after 24 h in contact with excess of Milli-Q water. After 30 h of irradiation of wavelength in the range 310-420 nm, with maximum intensity at 350 nm and of 30 mW/cm$^2$ radiation power at the sample position, the sample absorbed a quantity of Milli-Q water corresponding to the full pore volume of the porous material.

Utilization of the Nanoporous Materials

The novel nanoporous materials are expected to create the basis for novel technologies. The controlable hydrophobic/hydrophilic properties of the nanoporous materials can be coupled with the nano-scale structural control.

Possible areas of applications are as follows and will be explained in details in the following:

Membranes, e.g. ultra-filtration membranes with well-defined pore structure, size and hydrophilicity can be prepared, which show higher selectivity in filtration of molecules of different sizes. The control of hydrophilicity opens up for the possibility to prepare membranes working with different kinds of solvents, from organic non-polar solvents, such as toluene to polar solvents such as water. In addition, membranes prepared by polymers of the present invention can show high fluxes due to the high porosity relative to existing (commercial) ultra-filtration membranes.

Low refractive index materials.

Substrates for catalysis.

Templates for controling nanoscales of polymeric (e.g. conducting polymers), metallic or ceramic materials.

HPLC columns, e.g. monolithic HPLC columns, with tuneable hydrophilicity. Considerations similar to the case above on ultra-filtration membranes are applicable here as well.

Controlled drug release.

Controlled release of reactants into batch reactors.

Electro-osmotic solution transport for Lab-on-a-chip technology. The chemical groups formed during photo-oxidation are typically carboxylic, which at pH above 5 are mostly found in the carboxylate form. The presence of such ionizable groups is the necessary condition for the formation of ionic double layer (fixed carboxylate and mobile counterion (cation)) and therefore, in the presence of an electrical field, of electro-osmosis.

Separation or immobilization of biomolecules and biopolymers, e.g., DNA.

Miniaturized devices that permit to couple mass transport with detection, e.g., chemical reactors, sensors and diagnostic gadgets.

FIG. 1 illustrates the conceptual scheme of the present approach. The grey-shaded section of the figure is related to the preparation procedure of a specific nanoporous material. Otherwise this approach is argued to be of broad validity as a method, of course with experimental details (wavelength, sample thickness, irradiation intensity and time) to be adjusted relative to the spectroscopic and reactivity characteristics of the material at hand. The procedure is demonstrated on two types of nanoporous material matrices: polystyrene(PS) and cross-linked 1,2-polybutadiene (xPB). All polymers were prepared by the technique of "living anionic polymerization" thus obtaining very low dispersities in chain length and block composition. Nanoporous material samples of two morphologies were investigated: hexagonal (HEX) and gyroid (GYR). Electron micrographs of the two morphologies are shown in FIG. 2. The radiation wavelength range used for the modification of xPB was 310-420 nm peaking at 350 nm (see FIG. 8). Shorter wavelength, in the range 275-380 nm, and with maximum at 310 nm (see FIG. 6) was necessary for the treatment of PS. The xPB matrix of GYR morphology shown in FIG. 2 (B, C) will be discussed in further detail here (see also the Examples section). Thanks to its isotropy no external alignment is necessary to ensure pore percolation throughout the sample volume. Data on the PS matrix can be found further below in the Examples section. xPB samples of the HEX morphology show similar behavior under UV modification as the GYR samples. The surface of the native nanoporous polymer is essentially hydrocarbonic—thus hydrophobic, and displays a static water contact angle of 94°-97° or higher (an illustration is shown in FIG. 7). In prolonged contact with water over several months no mass uptake was observed for any of the native nanoporous material samples.

Figure 4:
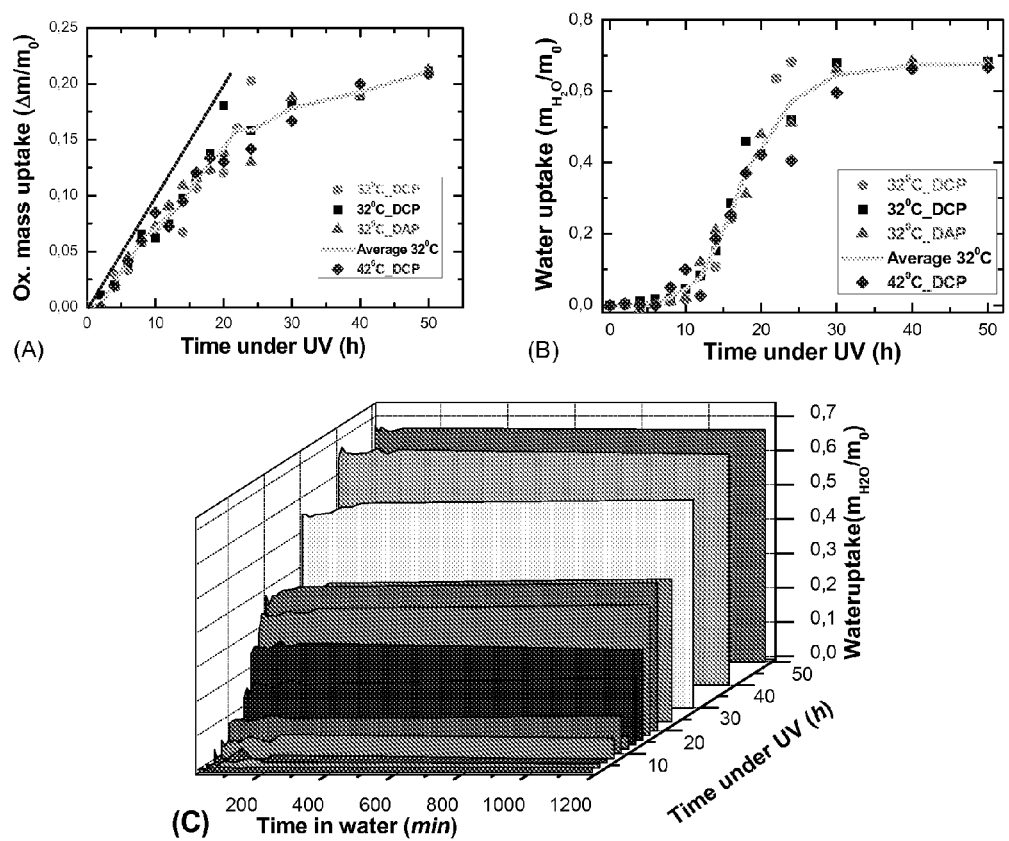
FIG. 4. Oxidation mass uptake, equilibrium and kinetics of water uptake as a function of UV irradiation time for cross-linked polybutadiene nanoporous samples. (A) Degree of oxidation expressed as dry mass increase relative to the unmodified samples for three sets of samples irradiated at 32° C. and one set at 42° C. Aromatic DCP (di-cumyl peroxide) and aliphatic DTAP (di-ter-amyl peroxide) were used as cross-linkers. (B) Equilibrium water mass uptake relative to the mass of the native nanoporous material in function of irradiation time of the same four sets of samples as in (A). The saturation behavior in (B) relates to the conserved morphology. (C) Time-resolved water uptake given as the fractional mass increase relative to dry mass of nanoporous material samples (0.5 mm thick discs of diameter 9 mm). The first measurement in each series, made 1 minute after contact with water, effectively shows saturation.

The sample mass increases with irradiation time due to oxygen fixation as plotted in FIG. 4 (A). After 50 h of irradiation the mass increases by 21% relative to the nanoporous native sample.

Water uptake and hydrophilic patterning. FIGS. 4 (B, C) show the equilibrium value and the kinetics for water uptake of samples exposed at increasing UV-irradiation times. In FIG. 4 (B) the sigmoid shape for the equilibrium water uptake shows that there is a lower limit of roughly 8 h in irradiation time before spontaneous wetting can happen. This can be interpreted as the time needed to reach a critical value for the surface density of photo-oxidative —COON and —OH groups. The water uptake saturates after 30 h of UV treatment at a value of 0.65±0.03. This corresponds to a water volume fraction of 0.35±0.01, which together with the dry oxidation mass uptake adds up to a total volume fraction of 0.45±0.02, assuming an overall density of 1 g cm$^{-3}$. The pore volume fraction of the original nanoporous material as measured by methanol uptake is 0.44±0.01, nicely matching the above value for the total volume fraction. This again indicates that the nano-structure is conserved and that most of the oxidative changes happen within a polymer layer confining the pores, much thinner than the cross-linked PB 'bulk' depth of 10-15 nm. Otherwise swelling and deformation of the most irradiated samples were to be expected in the presence of water. The chemical basis for the increased absorption during photo-oxidation is still debated; in the case of hydrocarbon polymers it is probably due to the formation of conjugated structures involving carbonyl groups (J. F. Rabek, *Polymer Photodegradation*, Chapman & Hall (1995); J. F. Rabek, *Photodegradation of Polymers*, Springer (1996), and the numerous references herein). The ability of the UV-modified samples to take up water remained unchanged for at least 6 months, where dry samples stored under Argon for the period behaved in the same way as freshly UV-irradiated ones. This is an attractive feature since many other hydrophilically modified polymers show irreversible hydrophobic recovery after few days of storage in the dry state.

EXAMPLES

Figure 6:
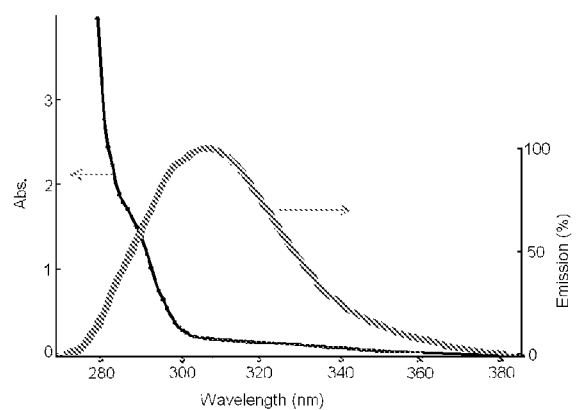
FIG. 6. Absorption UV-Vis of a 0.5 mm thick PS homopolymer sample and emission spectrum of the Philips TL 20W/12 RS SLV lamp used for the irradiation of PS samples.

Materials and Equipment
UV lamps:
Polystyrene was irradiated from 1 piece of Philips TL 20W/12 RS SLV. The irradiation intensity at the sample position was estimated to 7 mW/cm$^2$. The emission spectrum of the lamp is shown in FIG. 6.

Figure 8:
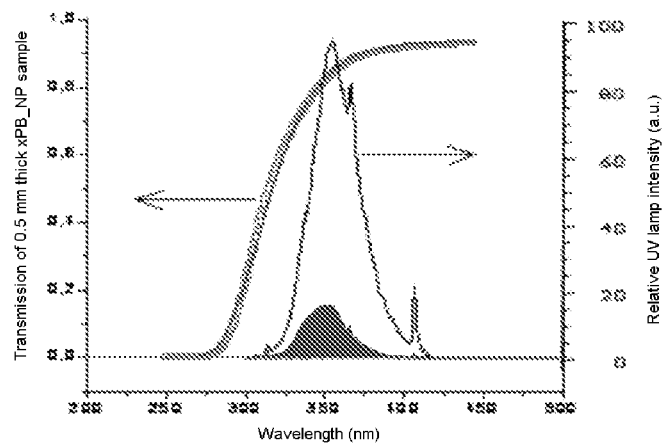
FIG. 8. Transmission UV-Vis spectrum of nanoporous cross-linked PB sample before UV treatment and emission spectrum of the Philips Cleo 25W RS UV lamp used for the irradiation of the samples. Radiation intensities were measured at the samples' spots and were on average 30 mW cm$^{-2}$ in the wavelength range 300-400 nm. The area in red shows the radiation absorbed by the sample at the start of the UV treatment.

Polybutadiene was irradiated from a setup containing 12 Philips Cleo 25W RS lamps. The irradiation intensity at the sample position was measured to 30±2 mW/cm$^2$. The emission spectrum of this lamp type is shown in FIG. 8.

Water Absorption Test
The water absorption of a material of the type defined herein is determined as follows.

Water absorption was measured as a difference between the mass of the nanoporous sample after contact with water and the dry mass. The contact with water was realized by submerging a piece of thoroughly dry nanoporous material directly into excess of distilled water (of Milli-Q purity or better) for at least 24 h. Typical sample masses used in the experiments were in the range 20-200 mg. The masses were measured by analytical balances with accuracy ±0.1 mg.

Example 1

Preparation of Nanoporous Polystyrene (PS)

The syntheis of the precursor polystyrene-polydimethylsiloxane block copolymer (PS-PDMS) and the preparation of the nanoporous PS (NP_PS) by selective degradation of the PDMS block in anhydrous HF are described in S. Ndoni, M. E. Vigild, R. H. Berg, *J. Am. Chem. Soc.* 125, 13366 (2003). One PS-PDMS polymer of total molecular mass 140 kg/mol of which 29% is silicone (in the hexagonal morphology), was prepared by living anionic polymerization in THF. Then samples of between 0.1 and 1 g of polymer were solvent cast onto flat bottom Petri dishes from 10% (w/w) THF solutions. THF was left to evaporate for 48 h under a gentle stream of Argon. The 0.020-0.30 mm thick films obtained were then treated for 1-2 h at 0° C. with anhydrous hydrogen fluoride (HF) to obtain nanoporous PS.

Example 2

Photooxidation of Nanoporous PS

In one example a polystyrene (PS) nanoporous polymer was obtained by selective etching of polydimethylsiloxane (PDMS) from a PS-PDMS block copolymer containing 29% of PDMS by volume. The etching procedure was as reported in Ndoni et al. (J. Am. Chem. Soc. 2003, 125, 13366-13367). A 20 μm thick film of nanoporous PS did not absorb any measurable quantity of Milli-Q water after 24 h in contact with excess of Milli-Q water. After 48 h of irradiation of wavelength in the range 275-380 nm, with maximum intensity at 310 nm and power of 7 mW/cm$^2$ at the sample position, the sample absorbed a quantity of Milli-Q water corresponding to the full pore volume created after the removal of PDMS.

Example 3

Preparation of Nanoporous Cross-Linked Polybutadiene (xPB)

The 1,2-polybutadiene-polydimethylsiloxane block copolymer (PB-PDMS) precursor was prepared by living anionic polymerization, as described in (F. Guo, J. W.

Andreasen, M. E. Vigild, S. Ndoni, *Macromolecules* 40, 3669 (2007)). The weight average molecular mass of the sample was 17.6 kg/mol with polydispersity index of 1.08 and PB mass fraction of 0.61. The sample showed gyroid morphology in the temperature range 100-180° C., as determined by rheology. Co-solutions in tetrahydrofurane (THF) of the precursor with 1% di(cumylperoxide) (DCP) or 2% di(teramyl peroxide) (DTAP) molar concentrations relative to the double bonds in the PB block were solvent cast onto flat bottom glass Petri dishes. THF was removed by slow evaporation under a gentle flow of Argon. Keeping the sample under Argon a second Petri dish of a smaller diameter was placed on top of the polymer. In the presence of Teflon spacers the polymer was squeezed between the Petri dishes until a film of 0.50 mm was formed. Cross-linking happened by heating for 2 h at 140° C. (150° C.) for the samples containing DCP (DTAP). Etching was done with tetrabutyl ammonium fluoride (TBAF) (1 mole/L in THF) for at least 36 h. ATR-FT-IR spectra were acquired on a 1600 series instrument from Perkin-Elmer. Each measurement was performed under constant pressure against the Zn-Se crystal. The polymer was exposed from one side to UV-350 nm, while being open to air.

Example 4

Photooxidation of Cross-Linked PB

The nanoporous samples (see Example 3) were exposed to photon radiation (310-420 nm) of average wavelength 350 nm for up to 50 h. In order to check the effect of temperature and nature of cross-linking agent on the photo-oxidation reaction, tests were made at two temperatures (32° C. and 42° C.) and with two cross-linkers (one aromatic (dicumyl peroxide) and one aliphatic (diamyl peroxide).

Figure 9:
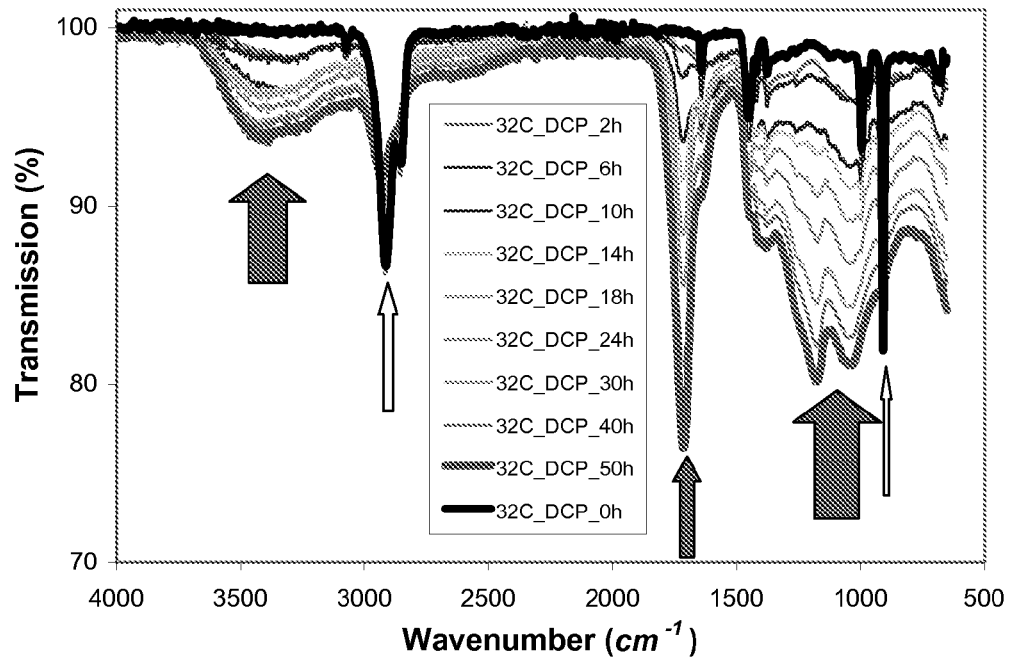
FIG. 9. FT-IR spectra of nanoporous 1,2-polybutadiene (NP) samples irradiated at different times by UV.

FT-IR spectra of nanoporous 1,2-polybutadiene (NP) samples irradiated at different times by UV neatly illustrate the gradual change in chemical composition as a function of UV irradiation time (see FIG. 9). Such a fine control of chemical composition would be difficult to realize by wet chemistry routes. Black and red thick lines represent the 'extremity' spectra for the 0 h and 50 h irradiated samples, respectively. The absorption bands at 3400 (increasing) 2900 (decreasing), 1700 (increasing) 1000-1200 (increasing) and 900 (sharp) (decreasing) $cm^{-1}$ are due to —O—H, —O—O—H (3400, 3250); C—H; C=O; C—O and C=C—H, respectively.

Figure 10:
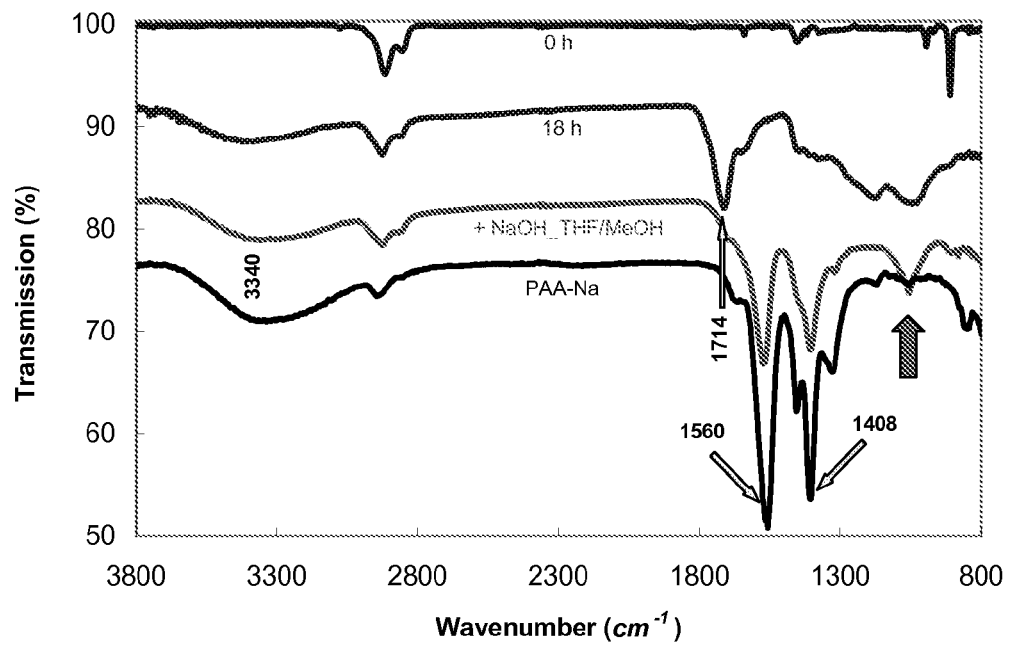
FIG. 10. FT-IR spectra of nanoporous 1,2-polybutadiene (NP) samples irradiated at different times by UV compared to a material prepared according to Guo et al. *Macromolecules* 2008, 41, 1486.

FIG. 10 illustrates FT-IR spectra of nanoporous 1,2-polybutadiene (NP) samples irradiated at different times by UV compared to a material prepared according to Guo et al. *Macromolecules* 2008, 41, 1486. FT-IR spectra for samples: 0 h (native NP), 18 h UV irradiated, the 18 h sample after treatment with THF/MeOH basic solution, and for poly (sodium acrylate) PAA-Na. The spectra were vertically shifted for the sake of clarity. The '18 h' spectrum is similar to the corresponding spectrum in FIG. 9 for the UV irradiated samples. The peak at 1714 $cm^{-1}$ is typical for carbonyl groups of different kinds, such as ketones, esters and carboxylic acids. By treating the sample with a base, in this case sodium hydroxide (NaOH) dissolved in 3:1 (v/v) tetrahydrofuran (THF)/MeOH, it is possible to distinguish carboxylic acids —COOH from ketones and most of the ester groups. The almost disappearance of the 1714 $cm^{-1}$ peak after the treatment strongly indicates that the majority of the carbonyl groups in the photooxidised NP are actually —COOH. In basic solution the —COOH groups are converted into carboxylate groups —COO$^-$, shifting absorption to 1560 $cm^{-1}$ and 1408 $cm^{-1}$ (symmetric and antisymmetric stretching, respectively). The spectrum after basic treatment is quite similar to the spectrum of PAA-Na in the wave number range 1200 -3800 $cm^{-1}$. However a distinctively higher absorption is observed for the UV-modified NP sample in the range 900-1200 $cm^{-1}$, with a well visible peak centered at 1050 $cm^{-1}$ (filled vertical arrow). Therefore a hydrophilic nanoporous sample containing PAA on the pore walls prepared by wet chemistry described in Guo et al. *Macromolecules* 2008, 41, 1486, is expected to miss significant absorption in the range 900-1200 $cm^{-1}$. This spectroscopic difference can be used to distinguish between on one side samples prepared by wet chemistry and on the other side NP samples prepared by photooxidation.

Another distinguishing feature of photooxidized NP samples is a gradient of oxidation degree relative to sample depth. This is due to diminishing intensity of UV deep in the sample relative to intensity at the surface directly exposed to UV as a result of UV absorption. For example, the carbonyl absorbance at 1714 $cm^{-1}$ at the side directly exposed to UV irradiation is higher than at the back side of a 0.5 mm thick NP sample, as shown in figure XX+1. The absorbance after 40 h of UV treatment is approximately 5 times higher on the front as compared to the back side. Such a gradient is not possible to realize by wet chemistry.

Figure 11:
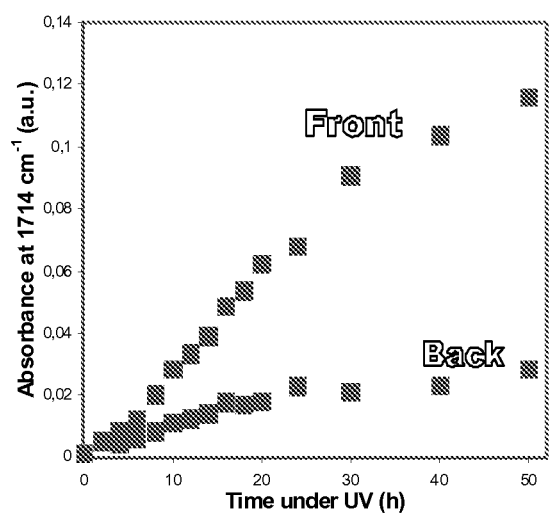
FIG. 11. Characterization of UV-modified nanoporous 1,2-polybutadiene (NP) samples by ATR-FT-IR. The technique probes the sample at micrometer depth from the measurement surface. The absorbance at 1714 cm$^{-1}$ (see FIGS. 9 and 10) on the side directly exposed to the UV irradiation (front) is significantly higher than on the opposite side (back).

FIG. 11 illustrates a characterization of UV-modified nanoporous 1,2-polybutadiene (NP)samples by ATR-FT-IR. The technique probes the sample at micrometer depth from the measurement surface. The absorbance at 1714 $cm^{-1}$ (see FIGS. 9 and 10) on the side directly exposed to the UV irradiation (front) is significantly higher than on the opposite side(back).

Example 5

UV-Patterning 0.5 mm thick nanoporous samples of xPB were covered by appropriate masks and exposed to UV 350 nm for 30 h. Four masks were used: two lithographic masks patterned at the micrometer length-scale (see FIG. 5 (A, B) for the respective patterned samples obtained); two masks prepared on aluminum plates by machining and patterned at millimeter length-scale (see FIG. 5 (C, D) for the respective patterned samples obtained)

Figure 5:
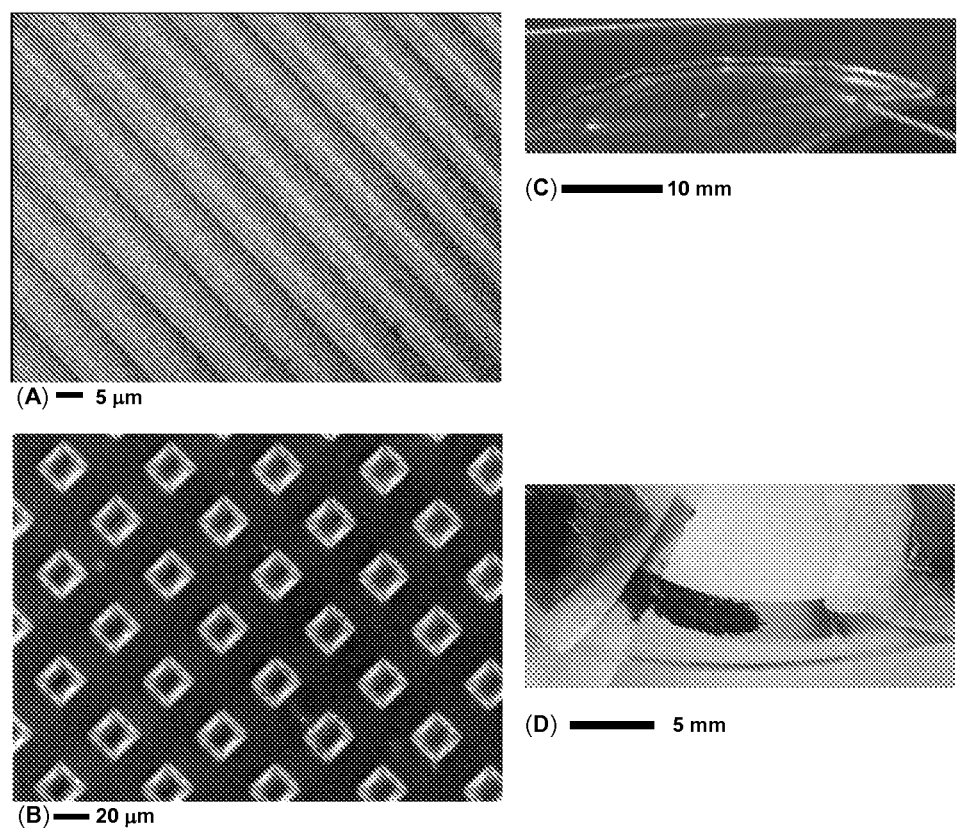
FIG. 5. Examples of hydrophilic patterned nanoporous materials. The groups of pictures (A) and (B) were taken under an optical microscope. The wet patterned nanoporous materials were placed between two microscope glasses in order to prevent water evaporation. The presence of water, exclusively in the hydrophilic regions gives rise to an increased contrast of refractive indices between the two zones. (A) Grid of alternating hydrophilic-hydrophobic stripes of width 5 µm; (B) Grid of hydrophilic squares of size 20 µm in a 2-D square lattice of 40 µm principal distance. (C) Demonstration of principle of 630 nm laser light guiding along a wet nanoporous zone formed as a 140° arch of 1 mm width and 0.3 mm depth. The light source (laser light passing through a syringe needle of 0.8 mm opening) is visible at the right bottom corner. The edges of the hydrophilic pattern visibly scatter light due to roughness of length scale ~10 µm conveyed from the UV mask during the patterning process; (D) Copper electrodeposition at 40 V from 1 M copper (II) chloride solution along a 2.0 mm widehydrophilic zone surrounded by hydrophobic nanoporous polymer (cathode on the left; both electrodes embrace the nanoporous material sample through Copper sheets and filter paper helping to keep the sample extremities wet).

FIG. 5 illustrates the UV-patterning of the hydrophobic matrix and two immediate applications on wave guiding and metal nano-templating. Fine patterns in the micrometer scale, as confirmed by FIG. 5 (A, B). When submerged into water such samples wet exclusively in the irradiated zones. The added water increases the refractive index in the hydrophilic regions providing the necessary picture contrast under the optical microscope, as well as the diffraction patterns in FIG. 5 (C, D). Again, the refractive index contrast allows light guiding at total internal reflection, as demonstrated in FIG. 5 (E). The estimated refractive index at 633 nm for the empty (water filled) nanoporous polymer is 1.30 (1.43).

The invention claimed is:
1. A method for the preparation of a nanoporous material of a polymer matrix which has a porosity of 0.1-90%(v/v) and an initial water absorption (%(w/w)) obtained after steps (a) and (b), but before irradiation in step (c), such that the ratio between said initial water absorption (%(w/w)) and said porosity (%(v/v)) is at the most 0.05, said matrix at least in part being rendered more hydrophilic so that said part of said polymer matrix has a final water absorption (%(w/w)) after step (c) such that the ratio between said final water absorption (%(w/w)) and said porosity (%(v/v)) is at least 0.05, the method comprising the steps of:

(a) preparing a precursor material comprising at least one polymeric component and having a first phase or micro phase and a second phase or micro-phase, wherein at least one polymeric component is a block-copolymer;

(b) removal of at least a part of the first phase or micro-phase of the precursor material prepared in step (a) effected by means of chemical etching, photo-chemical etching, cleaving, extraction, or evaporation, or is combination of these, so as to leave behind a nanoporous material of the polymer matrix, wherein the pores of said nanoporous material have an average diameter in the range of 1.0-100 nm, and wherein the periodicity of the pores is in the range of 1.0-100 nm;

(c) irradiating at least a part of said nanoporous material through a mask with light of a wave length of in the range of 300-400 nm in the presence of oxygen and/or ozone, wherein the mask provides a micrometer-scale pattern of hydrophilic surface sections in the matrix of the hydrophobic material.

* * * * *